(No Model.)
L. W. GROAT.
KNITTED SHIRT.
No. 527,551.　　　　　　Patented Oct. 16, 1894.
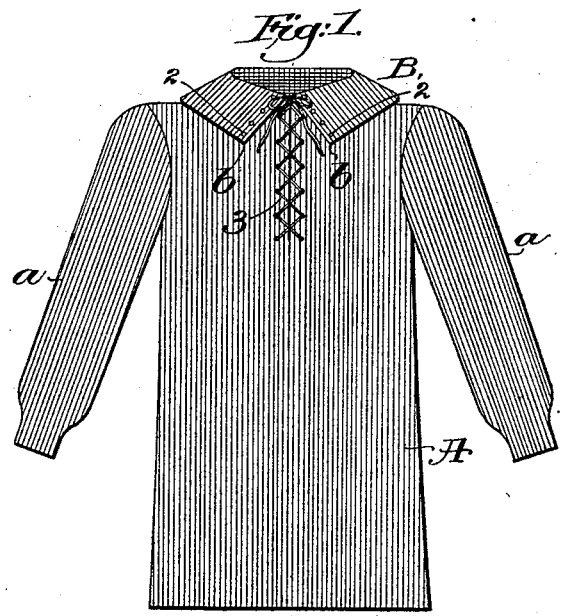
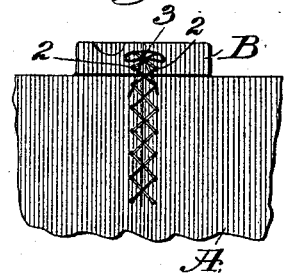
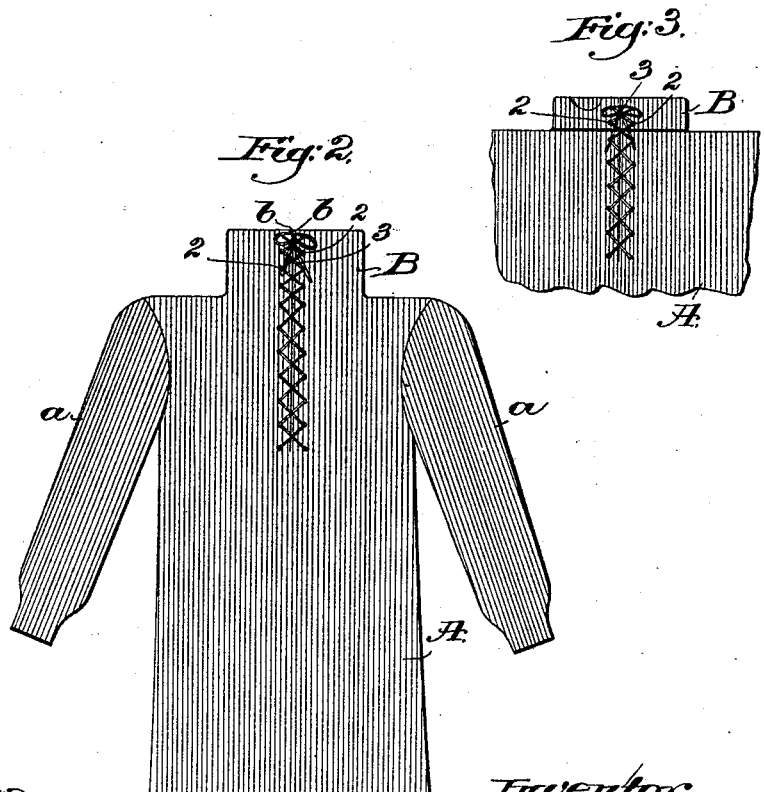

UNITED STATES PATENT OFFICE.

LOUIS W. GROAT, OF HUDSON, NEW YORK.

KNITTED SHIRT.

SPECIFICATION forming part of Letters Patent No. 527,551, dated October 16, 1894.

Application filed July 23, 1894. Serial No. 518,323. (No model.)

*To all whom it may concern:*

Be it known that I, LOUIS W. GROAT, of Hudson, county of Columbia, State of New York, have invented an Improvement in Athletic Garments, of which the following description, in connection with the accompanying drawings, is a specification, like letters and figures on the drawings representing like parts.

Shirts now used for athletic purposes are commonly made with long tubular collars, and outing shirts are laced at front from the neck band down the front.

I have aimed to produce a novel knitted garment adapted to surround the neck as a high collar, or as a double roll high collar, when desired, or to be laid down as a broad or sailor collar in warmer weather, the high collar being preferable in cool days, and the sailor collar for yachting or for ladies' use.

My invention consists in a knitted garment provided with a long tubular collar open in front, the opening preferably extending down into the body or neck of the garment, and having ends at the front of the neck and adapted when fastened together as a tube to present a high collar or a double roll collar, and when unfastened to present a sailor or turn-down collar, the said collar having co-operating with it suitable fastening means, herein shown as a lacing cord, which may be strung through holes in the ends of the collar when it is desired to confine said ends together to constitute a double roll or standing collar.

Figure 1 shows a shirt having my improved collar arranged as a sailor or turn-down collar; Fig. 2, another view thereof with the ends of the collar secured together to form a tube or high collar, and Fig. 3 shows the high collar of Fig. 2 folded over and laced for a double roll high collar.

The body A of the shirt, its sleeves *a, a,* and the collar B, may be composed of any usual materials and be knitted in any usual way, the collar being connected with the shoulder in any usual way, either by knitting or seaming, but the collar will be left open in front or at the throat to show ends *b, b.*

The collar is of a length sufficient to constitute a high collar, as in Fig. 2, or a double roll standing collar, as in Fig. 3, or it may be turned down like a sailor collar, as in Fig. 1.

To enable the collar to be put into these different shapes and serve for different users, tastes, or conditions of weather, the ends of the collar, as shown, are provided with suitable eyelet holes 2, to receive a suitable lacing cord, 3, and if desired the body of the shirt below the collar may be slitted and also provided with eyelet holes for the lacing, so that a long lacing cord may be used and always remain in the shirt, it, besides being useful, being also ornamental.

If a high collar is required for a long neck, the lacing will be run through the eyelet holes, as in Fig. 2, and if the collar is to be tight fitting double roll standing, then for the best result, and to bind the collar in its folded or double condition the collar will be turned over, as in Fig. 3, and the lacing cord will be passed through the eyelet holes of the inner and outer plies of the collar, and also the ends of the collar will be laced across one end to the other, as shown in Fig. 3, but if the collar is to be a sailor or turn down collar the lacing will be removed from the eyelet holes in the end of the collar and be used in the eyelet holes at the neck, or more or less below the neck, according to the extent of the opening desired at the front of the neck.

Having described my invention, what I claim as new, and desire to secure by Letters Patent, is—

The herein described knitted garment, comprising a body having a wide collar open in front at the throat to form ends and provided at such ends with an adjustable fastening, by means of which the said collar may be arranged as a closed high standing collar, or a closed double-roll collar, or a turn-down or sailor collar, more or less open at the neck or throat, substantially as set forth.

In testimony whereof I have signed my name to this specification in the presence of two subscribing witnesses.

LOUIS W. GROAT.

Witnesses:
C. W. BOSTWICK,
ELBERT PAYNE.